July 8, 1958 C. M. VALOIS 2,841,894
COMBINATION BUMPER AND BULLDOZER ATTACHMENT
Filed Feb. 10, 1956 4 Sheets-Sheet 2
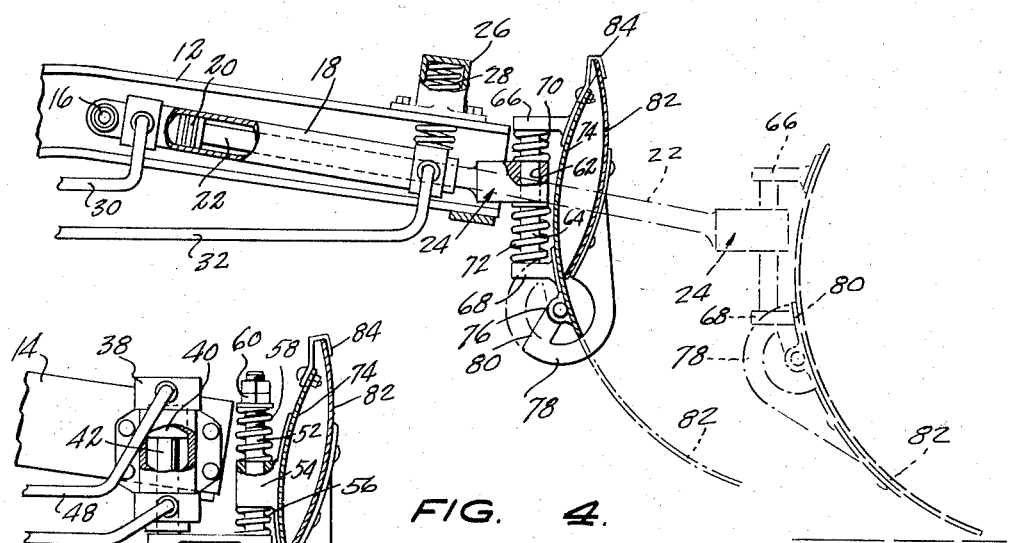
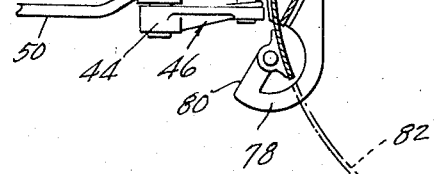
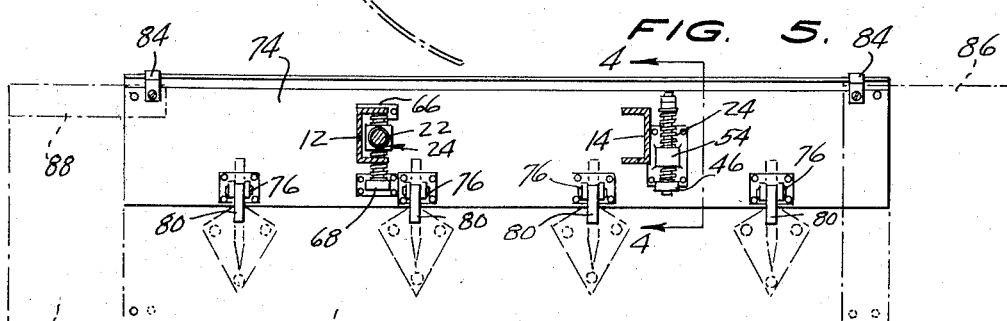
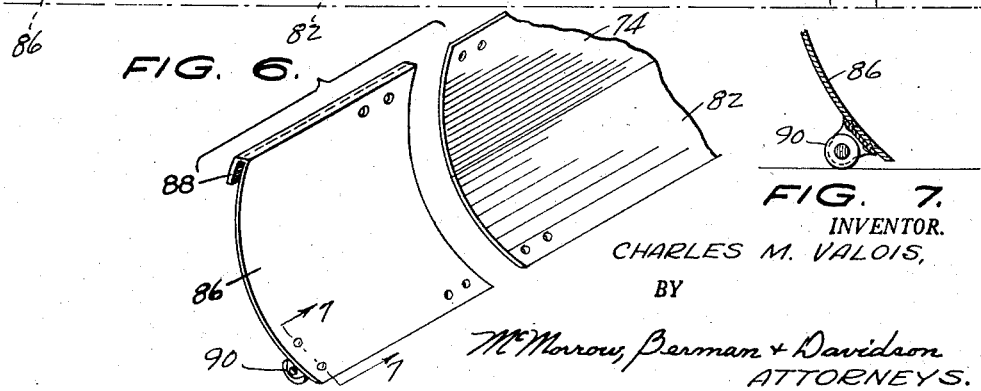
INVENTOR.
CHARLES M. VALOIS,
BY
McMorrow, Berman + Davidson
ATTORNEYS.

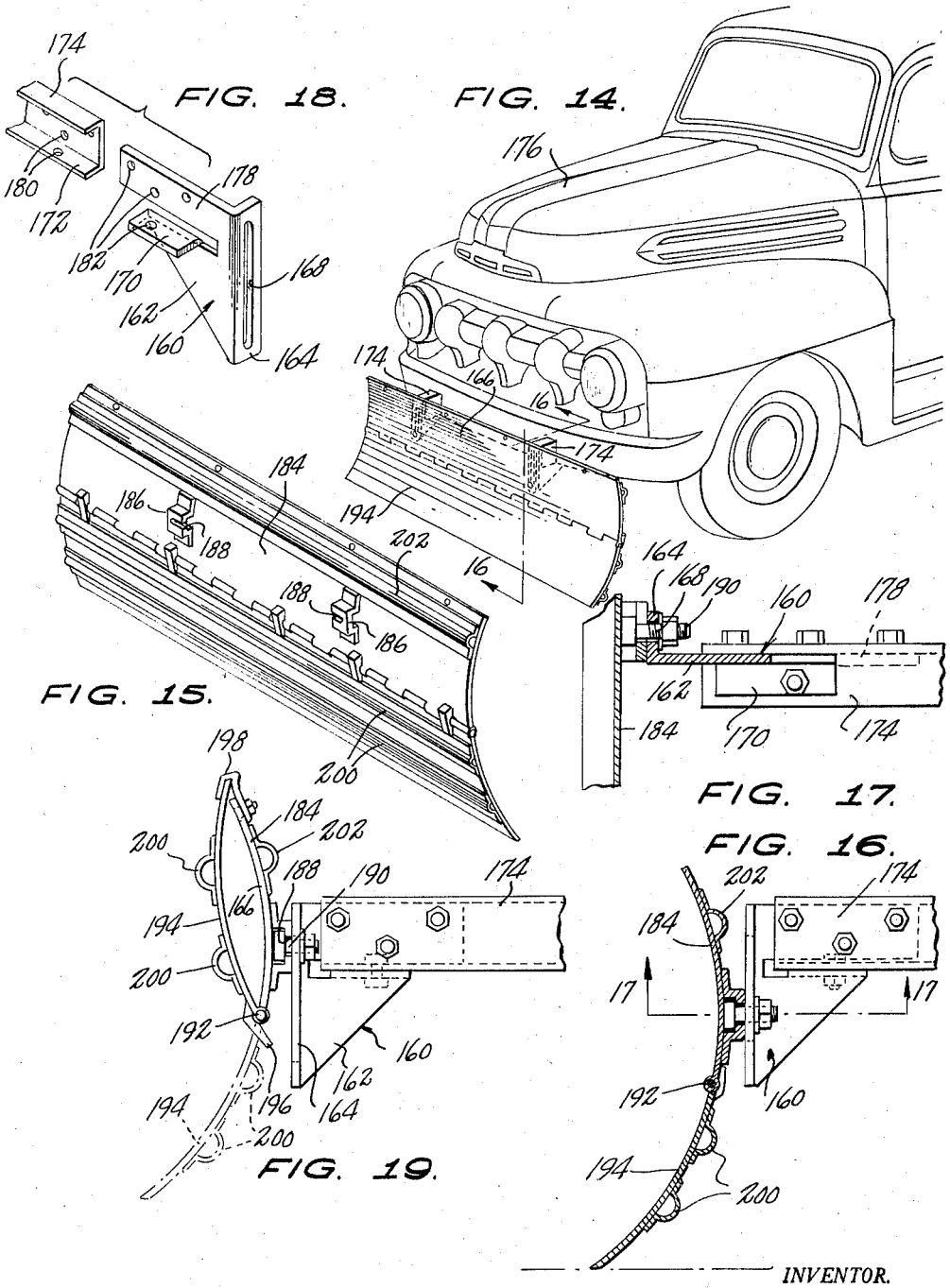

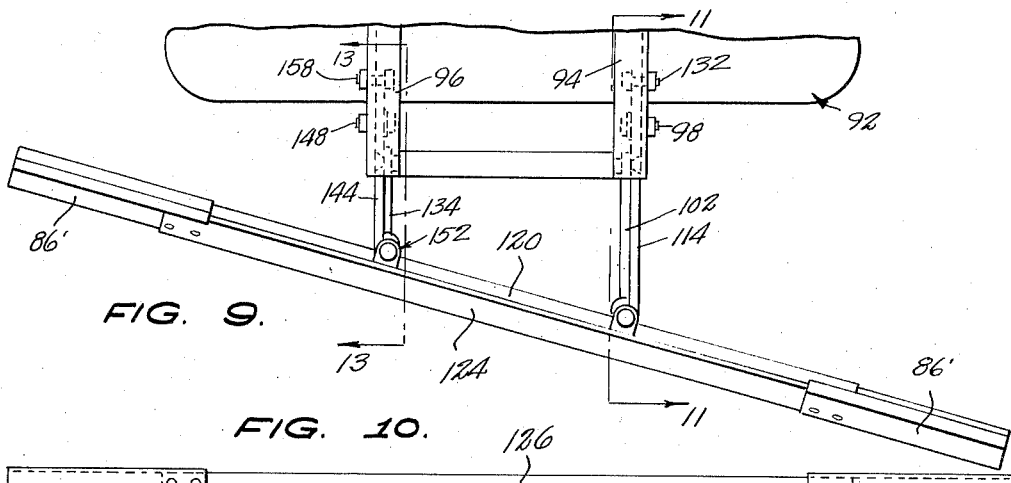
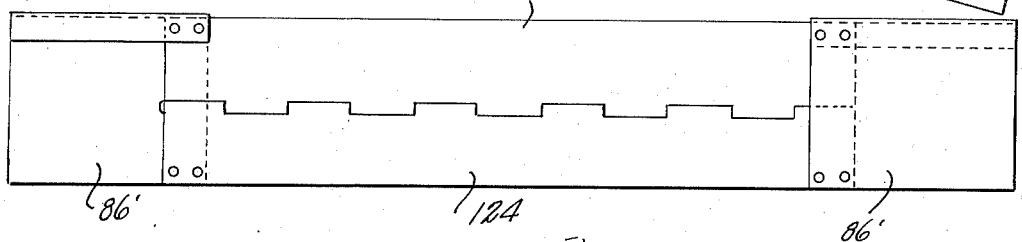
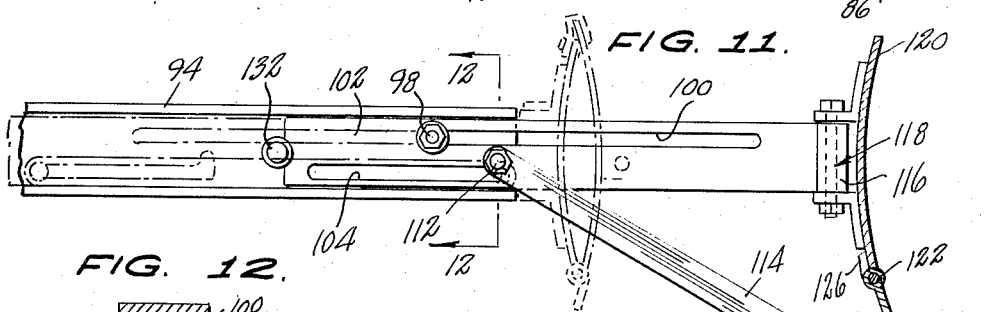
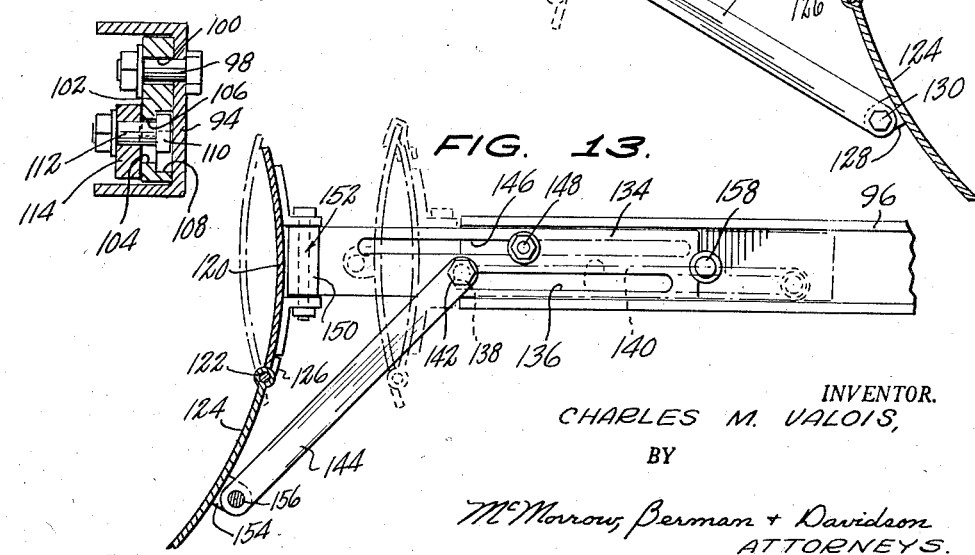

July 8, 1958 — C. M. VALOIS — 2,841,894
COMBINATION BUMPER AND BULLDOZER ATTACHMENT
Filed Feb. 10, 1956 — 4 Sheets-Sheet 4

INVENTOR.
CHARLES M. VALOIS,
BY
McMorrow, Berman + Davidson
ATTORNEYS.

United States Patent Office 2,841,894
Patented July 8, 1958

2,841,894

COMBINATION BUMPER AND BULLDOZER ATTACHMENT

Charles M. Valois, Miami, Fla.

Application February 10, 1956, Serial No. 564,731

8 Claims. (Cl. 37—42)

This invention relates to a combination bumper and bulldozer attachment for a self-propelled vehicle and has for its primary object to convert a truck or like self-propelled vehicle into an earth or snow moving device.

Another object is to employ the device as a bumper for the vehicle when it is not in service as an earth moving implement.

A further object is to enable the implement to be adjusted to a selected angle with relation to the path of travel of the vehicle so that the substance being moved may be directed to one side of the path along which the vehicle moves.

Still another object is to yieldingly support the bumper and bulldozer attachment for vertical movement relative to the vehicle.

Still another object is to support the attachment for vertical adjustment relative to the vehicle.

The above and other objects may be attained by employing this invention which embodies among its features supports carried by the side rails of a vehicle and extending longitudinally therefrom adjacent the front ends thereof, a transversely curved bumper carried by the supports and extending horizontally across the front of the vehicle with its concave side remote from the vehicle, and a transversely curved bulldozer blade supported on the bumper for movement adjacent the lower edge thereof in a vertical arcuate path from an inactive position in which its concave side lies adjacent the concave side of the bumper to an active position in which the bulldozer blade lies below the bumper with its concave side remote from the vehicle.

Other features include stops carried by the bulldozer blade and extending outwardly therefrom adjacent the bumper for engaging the bumper and arresting downward movement of the bulldozer blade beyond a predetermined position, means carried by the side rails of the vehicle and operatively connected to the supports for advancing the supports beyond the forward end of the vehicle, and transversely curved extensions detachably connected to the bumper and to the bulldozer blade and extending longitudinally from opposite ends thereof.

Still other features include cushioning means carried by the supports and operatively connected to the bumper for yieldingly supporting the bumper for vertical movement, a drawing means carried by the side rails and operatively connected to the supports for holding the bumper at a selected height in front of the vehicle, and rollers carried by the extensions for engaging a surface and holding the leading edges of the bulldozer blade and the extensions in spaced relation to said surface.

Other features include slide bars mounted on the side rails for movement longitudinally with relation to said side rails, supports carried by the slide bars for movement therewith adjacent the forward end of the vehicle, a bumper carried by the supports and extending transversely across the vehicle adjacent the front end thereof a bulldozer blade hingedly connected to the bumper for movement in a vertical arcuate path about a horizontal axis adjacent the lower edge of the bumper and braces carried by the slide bars and detachably connected to the bulldozer blade for rigidifying the blade when it is in use.

In the drawings:

Figure 3 is an enlarged fragmentary sectional view taken substantially on the line 3—3 of Figure 1;

Figure 4 is a view similar to Figure 3, showing the opposite end of the device and the mounting thereof to the frame or side rail of the vehicle;

Figure 5 is a vertical sectional view through the frame of the vehicle showing this combination implement mounted thereon and indicating in broken lines the extended position of the device;

Figure 6 is an enlarged exploded perspective view of one end of the bumper and bulldozer blade and its relation to an extension;

Figure 7 is a fragmentary sectional view taken substantially on the line 7—7 of Figure 6;

Figure 9 is a fragmentary plan view of a modified form of the invention;

Figure 10 is a front view in elevation of the modification illustrated in Figure 9;

Figure 11 is a fragmentary sectional view taken substantially on the line 11—11 of Figure 9;

Figure 12 is a fragmentary sectional view on an enlarged scale taken substantially on the line 12—12 of Figure 11;

Figure 13 is a fragmentary enlarged sectional view taken substantially on the line 13—13 of Figure 9;

Figure 14 is a fragmentary perspective view of a self-propelled vehicle showing a modified form of this invention attached to the forward end thereof;

Figure 15 is a perspective view of the rear of the device illustrated in Figure 14;

Figure 16 is a fragmentary enlarged sectional view taken substantially on the line 16—16 of Figure 14;

Figure 17 is a fragmentary horizontal sectional view taken substantially on the line 17—17 of Figure 16;

Figure 18 is a fragmentary exploded view of one of the side rails and a support for the bumper and bulldozer blade; and Figure 19 is a fragmentary side view of the device illustrated in Figure 14, showing the bulldozer blade elevated and extending across the forward face of the bumper.

Figures 1, 2, 8:
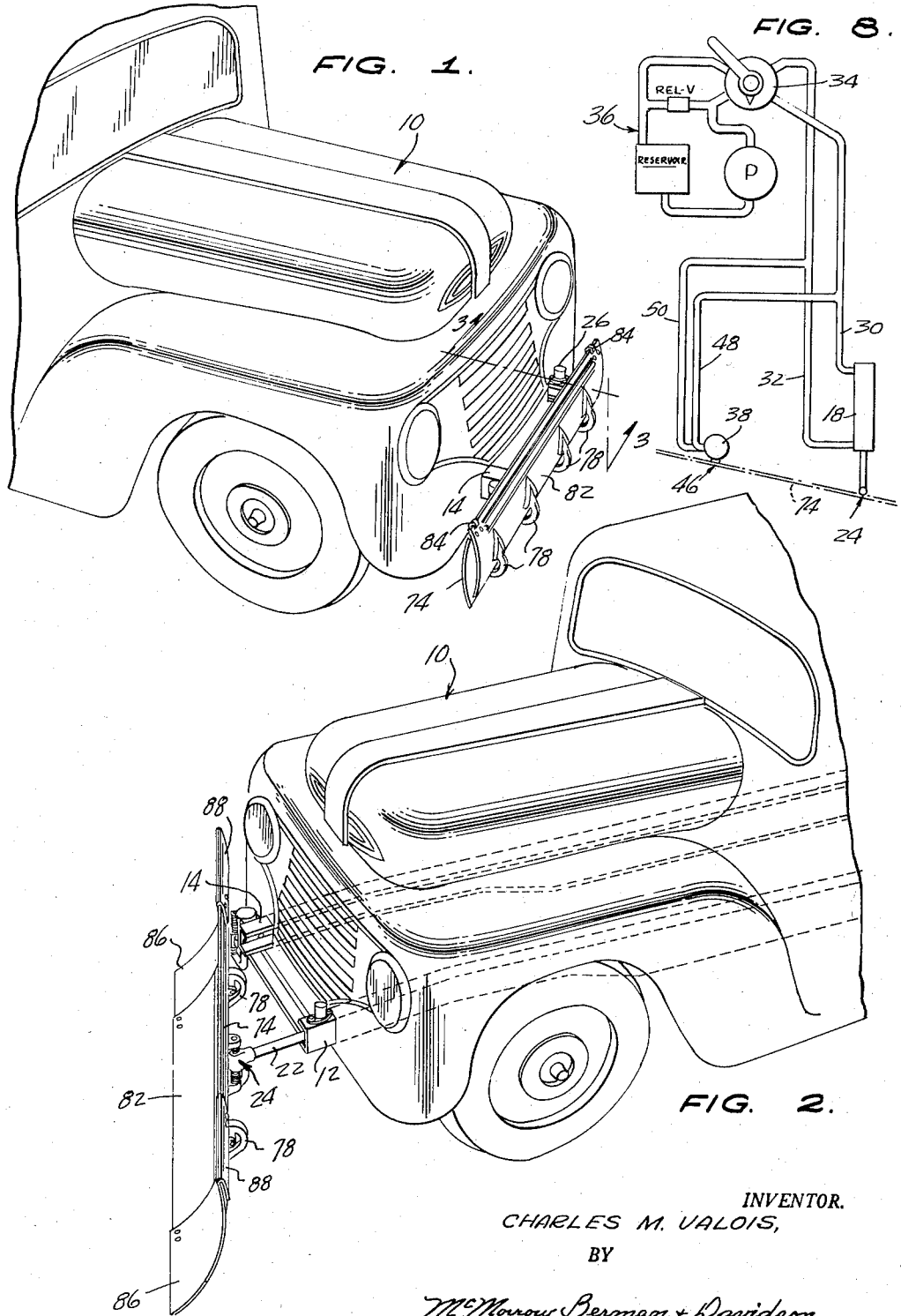
Figure 1 is a fragmentary perspective view of a self-propelled vehicle equipped with this improved combination bumper and bulldozer attachment showing the bulldozer attachment elevated and covering the forward side of the bumper.
Figure 2 is a view similar to Figure 1, showing the bulldozer blade in operative position for snow or earth moving.
Figure 8 is a diagrammatic view of the hydraulic system by which the implement is moved to an angular position relative to the vehicle.

Referring to the drawings in detail, a vehicle 10 is provided with a frame having longitudinally extending spaced parallel side rails 12 and 14. The side rails 12 and 14 are channel shaped with the flanges thereof disposed toward one another, as will be readily understood upon reference to Figure 5.

Pivotally connected as at 16 to the side rail 12 for oscillating movement between the flanges thereof and extending longitudinally with relation thereto is an hydraulic cylinder 18 in which is mounted for longitudinal movement a piston 20 which is connected to a piston rod 22 which rod extends through the end of the cylinder 18 remote from the pivot 16 and carries a support 24. Carried by the side rail 12 adjacent the forward end thereof and extending upwardly therefrom is a cap 26 defining a seat for the upper end of a compression coiled spring 28, the lower end of which bears on the cylinder 18 adjacent the end thereof remote from the pivot 16 to yieldingly urge the forward end of said cylinder downwardly, as will be readily understood upon reference to Figure 3. Opposite ends of the cylinder 18 are connected through the medium of conduits 30 and 32 to an hydraulic control valve 34 which is mounted within the cab of the vehicle 10 which is connected to a conventional hydraulic system 36 carried by the vehicle.

Mounted on the side rail 14 adjacent the forward end thereof is a vertically extending hydraulic cylinder 38 in which works a piston 40 having a piston rod 42 which extends downwardly through the lower end of the cylinder 38 and carries a horizontally extending bracket 44 defining a support designated generally 46. Opposite ends of the cylinder 38 are connected through the medium of ducts or conduits 48 and 50 with the ducts 30 and 32, respectively, so that when fluid under pressure is delivered from the valve 34 through the forward lower end of the cylinder 18, fluid will also be delivered through the duct or conduit 50 to the lower end of the cylinder 38 to thus move the pistons 20 and 40 upwardly in their respective cylinders.

Carried by the brackets 44 and extending upwardly therefrom adjacent the forward end thereof is a rod 52 on which is mounted for vertical movement a sleeve 54. A cushioning spring 56 encircles the rod 52 between the bracket 44 and the sleeve 54 and a compression coiled spring 58 is seated on the upper side of the sleeve 54 in encircling relation with the rod 52. The upper end of the spring 58 is engaged by an adjusting nut 60 which threadedly engages the rod 52 so that the pressure with which the spring 58 bears on the sleeve 54 may be governed. It will thus be seen that the sleeve 54 is mounted for sliding movement on the rod 52 in such a manner that such movement is cushioned in either direction.

The support 24 is provided with a vertically extending opening 62 and mounted for sliding movement in said opening is a vertically extending rod or pin 64 carrying at its upper and lower ends, respectively, brackets 66 and 68. Compression coiled springs 70 and 72 encircle the pin or rod 64 above and below the support 24 and serve as cushioning means on which the brackets 66 and 68 are yieldingly supported in the support 24. Riveted or otherwise secured to the brackets 66 and 68 is a concavely curved bumper 74 which extends transversely across the vehicle and is welded or otherwise secured to the sleeve 54 previously described. It will thus be seen that the bumper 74 will be supported on the side rails 12 and 14 for yielding vertical movement and angular adjustment according to the position of the piston 20 within the cylinder 18.

Carried by the rear convex face of the bumper 74 adjacent the lower edge thereof are longitudinally spaced rearwardly extending bearings 76 in which are mounted for rotation about a common horizontal axis brackets 78 having shoulders 80 which, when the brackets are in lowered position, engage the rear side of the bumper 74 and form stops which limit the movement of the brackets about the common horizontal axis. Riveted or otherwise secured to the brackets 78 and extending outwardly therefrom adjacent the ends thereof remote from the common horizontal axis is a transversely curved bulldozer blade 82 which, when not in use, is held adjacent the concave face of the bumper 74 by suitable clips 84. With the bulldozer blade 82 elevated, as illustrated in Figures 3 and 4, the stops 80, of course, do not engage the rear convex side of the bumper 74 but when the bulldozer blade 82 is moved to lowered position, as illustrated in broken lines in Figures 3 and 4, and in full lines in Figure 2, the stops 80 will engage the rear side of the bumper 74 to arrest downward movement of the bulldozer blade 82.

In order to stiffen and hold the bumper 74 and bulldozer blade 82 in extended position, and also to assure the movement of the material being operated upon beyond the sides of the vehicle 10, I provide curved extensions 86 carrying hooked flanges 88 which are adapted to engage over the upper edge of the bumper 74 and be bolted to the bumper and to the bulldozer blade. In the preferred form of the invention, each extension 86 is provided with a roller 90 which is adapted to engage the surface traversed by the device to maintain the lower edge of the bulldozer blade in spaced relation to the surface.

In the modified form of the invention illustrated in Figures 9 through 13, inclusive, a vehicle designated generally 92 is provided with a frame having spaced parallel longitudinally extending side rails 94 and 96 of channel formation having top and bottom opposed flanges disposed to extend toward one another. Extending through the side rail 94 is a bolt 98 which extends through a slot 100 formed in a side bar 102 and extending longitudinally thereof intermediate the upper and lower edges of said side rail. A similar longitudinally extending slot 104 extends through the side bar 102 and extending laterally from said slot 104 adjacent the end thereof adjacent the forward end of the vehicle is an upwardly extending notch 106, the purpose of which will hereinafter appear. An elongated longitudinally extending recess 108 opens into the side bar 102 through the side thereof adjacent the web of the side rail 94 and communicates with the slot 104 for receiving the head 110 of a pivot pin 112, the purpose of which will hereinafter appear. Pivotally connected to the pivot pin 112 and extending forwardly therefrom and beyond the forward end of the side rail 94 is a brace 114, the purpose of which will hereinafter appear.

Carried by the slide bar 102 adjacent the forward end thereof is a tubular barrel 116, the axis of which extends vertically and said barrel defines a support 118 for a bumper 120 of transversely curved cross section which bumper corresponds in all respects to the bumper 74 previously referred to. Hingedly connected as at 122 to the bottom edge of the bumper 120 is a bulldozer blade 124 which is transversely curved throughout its length and carries adjacent its upper edge stops 126 which are adapted to engage the rear side of the bumper 120 when the blade 124 is in active position. Carried by the blade 124 intermediate the upper and lower edges thereof are spaced ears 128 which are pierced to receive a bolt 130 by means of which the brace 114 is detachably connected to the bulldozer blade 124 to stiffen and rigidify said blade when it is in operation. The stop pin 132 removably extends through the web of the side rail 94 in spaced relation to the forward end thereof for engaging the rear end of the slide bar 102 and holding it extended, as illustrated in full lines, as illustrated in Figures 9 and 11.

Mounted for longitudinal sliding movement between the upper and lower flanges of the side rail 96 is a slide bar 134 which, like the slide bar 102, is provided with an elongated longitudinal slot 136, the forward end of which opens into an upwardly extending recess 138. Like the slide bar 102, previously referred to, the slide bar 134 is provided with an elongated longitudinal recess 140 which opens through the bar 134 adjacent the flange of the side rail 96 and communicates with a slot 136 to receive the head of a pivot pin 142 by means of which a brace 144 is pivotally and slidably connected to the slide bar 134. Extending through the slide bar 134 in spaced parallel relation to the slot 136 is a slot 146 through which extends a retaining bolt 148 which corresponds in all respects to the bolt 98 in holding the slide bar 134 in position between the flanges of the side rail 96 for longitudinal sliding movement relative thereto. A tubular barrel 150 is carried by the slide bar 134 adjacent the forward end thereof and defines a support 152 by means of which the bumper 120 is connected to the slide bar 134. Carried by the bulldozer blade 124 near the end thereof remote from the ears 128 are ears 154 for the reception of a bolt 156 by means of which the bulldozer blade 124 is detachably connected to the brace 144. A stop pin 158 is detachably connected to the side rail 96 and extends outwardly therefrom between the flanges thereof to form an abutment against which the rear end of the slide bar 134 is engaged when the device is in use as a bulldozer.

When the parts are extended, as illustrated in Figures 11 and 13, the extensions 86' are detachably connected thereto in the manner previously described.

In the further modification of the invention, illustrated in Figures 14 through 18, inclusive, right and left brackets designated generally 160 comprise triangular body portions 162 carrying perpendicular flanges 164 adjacent one end thereof to define supports for the bumper 166. Each flange 164 extends vertically and is provided with an elongated longitudinal slot 168, the purpose of which will hereinafter appear. Extending laterally from the triangular body 162 of each support 160 is a horizontal flange 170 which is adapted to engage the bottom flange 172 of a side rail 174 of the chassis of a self-propelled vehicle 176. A tongue 178 is carried by a flange 164 in spaced parallel relation to the triangular body 162 of each support 160 and is adapted to receive the side flange 172 of the side rail 174 of the vehicle to which the support 160 is attached. The side rail 174 and flange 172 are provided with openings 180 which are adapted to register with openings 182 extending through the flange 170 and tongue 176 for the reception of bolts by which the supports 160 are connected to the side rails 174 of the vehicle 176.

A curved bumper 184 carries longitudinally spaced coupling brackets 186 having slots 188 extending therethrough for the reception of bolts 190 which extend through the slots 168 in the flanges 164 of the supports 160 to adjustably support the bumper 184 on the side rails 174 of the vehicle 176. Hingedly connected as at 192 to the lower edge of the transversely curved bumper 184 for movement about a horizontal axis adjacent the lower edge of said bumper is a bulldozer blade 194 carrying stops 196 which extend outwardly from the edge thereof adjacent the bumper 184 and detachably connected to the bumper 184 adjacent opposite ends thereof are clips 198 which are adapted to engage the bulldozer blade 194 when the latter is folded upwardly, as illustrated in Figure 19. Longitudinally extending reinforcing ribs 200 are carried by the bulldozer blade 194 and extend throughout the length thereof in transversely spaced relation, and carried by the bumper 184 adjacent the upper edge thereof is a longitudinally extending reinforcing rib 202.

In use, when it is desired to move snow, earth or the like, the bulldozer blade of each form of the invention is lowered, as suggested in the various figures of the drawings so that upon the advance of the self-propelled vehicle to which the device is connected, the lower edge of the blade will engage the substance to be moved and shove it along the path of travel of the vehicle. When the structure of the blade and mounting is such as is illustrated in Figures 9 through 13, it is obvious that by extending the slide bars 102 and 134 and connecting the braces 114 and 144 to the lowered bulldozer blade 124, the blade will be held at an angle to the path of travel of the vehicle. This will tend to shove any matter engaged by the bulldozer blade to one side of the path of travel of the vehicle. When the bulldozer blade 124 is not in use, however, it is folded upwardly, as suggested by the broken lines in Figures 11 and 13, and the stop pins 132 and 158 are disengaged from the rear ends of the slide bars 102 and 134, respectively, so that the slide bars may be moved rearwardly along the side rails 94 and 96 of the vehicle. Prior to moving the slide bars, however, the braces 114 and 144 are disengaged from the recesses in the slide bars and the braces slid longitudinally along the slide bars to lie parallel to the flanges of the side rails 94 and 96.

In employing the device illustrated in Figures 1 through 8, inclusive, it is obvious that by manipulating the valve 134, the bumper 74 may be moved to extend at an angle to the front end of the vehicle 10, as suggested in Figure 2, and upon lowering the bulldozer blade 82, it will be disposed adjacent the surface along which the vehicle advances so as to move any substance that may be resting on the surface and push it to one side of the path of advance of the vehicle. By reason of the cushioned mounting of the bumper 74 on the supports 24 and because of the fact that the cylinder 18 is mounted for more or less universal movement, it is obvious that the device may be placed in service simply by disengaging the clips 84 from the bulldozer blade 82 and allowing it to swing downwardly about the horizontal axis into substantially broken line position illustrated in Figures 3 and 4. As the piston 20 moves downwardly in the cylinder 18, the piston 40 moves downwardly in the cylinder 38 so that the opposite ends of the bulldozer blade 82 and the bumper 74 move upwardly and downwardly simultaneously according to the manipulation of the valve 34.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

1. A combination bumper and bulldozer attachment for a self-propelled vehicle having transversely spaced longitudinally extending side rails, said bumper and bulldozer attachment comprising supports carried by the side rails of the vehicle and extending longitudinally therefrom adjacent the front ends thereof, a concavely curved bumper carried by the supports and extending horizontally across the front of the vehicle with its concave side remote from said vehicle, and a transversely curved bulldozer blade supported on the bumper for movement adjacent the lower edge thereof in a vertical arcuate path from an inactive position in which its concave side lies adjacent the concave side of the bumper to an active position in which it lies below the bumper with its concave side remote from the vehicle.

2. A combination bumper and bulldozer attachment for a self-propelled vehicle having transversely spaced longitudinally extending side rails, said bumper and bulldozer attachment comprising supports carried by the side rails of the vehicle and extending longitudinally therefrom adjacent the front ends thereof, a concavely curved bumper carried by the supports and extending horizontally across the front of the vehicle with its concave side remote from said vehicle, a transversely curved bulldozer blade supported on the bumper for movement adjacent the lower edge thereof in a vertical arcuate path from an inactive position in which its concave side lies adjacent the concave side of the bumper to an active position in which it lies below the bumper with its concave side remote from the vehicle, and stops carried by the bulldozer blade and extending outwardly therefrom adjacent the bumper for engaging the bumper and arresting downward movement of the bulldozer blade beyond a predetermined position.

3. A combination bumper and bulldozer attachment for a self-propelled vehicle having transversely spaced longitudinally extending side rails, said bumper and bulldozer attachment comprising supports carried by the side rails of the vehicle and extending longitudinally therefrom adjacent the front ends thereof, a concavely curved bumper carried by the supports and extending horizontally across the front of the vehicle with its concave side remote from said vehicle, a transversely curved bulldozer blade supported on the bumper for movement adjacent the lower edge thereof in a vertical arcuate path from an inactive position in which its concave side lies adjacent the concave side of the bumper to an active position in which it lies below the bumper with its concave side remote from the vehicle, and means carried by the side rails of the vehicle and operatively connected to the supports for advancing the supports beyond the forward end of the vehicle.

4. A combination bumper and bulldozer attachment for a self-propelled vehicle having transversely spaced longitudinally extending side rails, said bumper and bulldozer attachment comprising supports carried by the side rails of the vehicle and extending longitudinally therefrom adjacent the front ends thereof, a concavely curved bumper carried by the supports and extending horizontally across the front of the vehicle with its concave side remote from said vehicle, a transversely curved bulldozer blade supported on the bumper for movement adjacent the lower edge thereof in a vertical arcuate path from an inactive position in which its concave side lies adjacent the concave side of the bumper to an active position in which it lies below the bumper with its concave side remote from the vehicle, and means carried by the side rails of the vehicle and operatively connected to the supports for selectively advancing the supports beyond the forward end of the vehicle.

5. A combination bumper and bulldozer attachment for a self-propelled vehicle having transversely spaced longitudinally extending side rails, said bumper and bulldozer attachment comprising supports carried by the side rails of the vehicle and extending longitudinally therefrom adjacent the front ends thereof, a concavely curved bumper carried by the supports and extending horizontally across the front of the vehicle with its concave side remote from said vehicle, a transversely curved bulldozer blade supported on the bumper for movement adjacent the lower edge thereof in a vertical arcuate path from an inactive position in which its concave side lies adjacent the concave side of the bumper to an active position in which it lies below the bumper with its concave side remote from the vehicle, and transversely curved extensions detachably connected to the bumper and to the bulldozer blade and extending longitudinally from opposite ends thereof.

6. A combination bumper and bulldozer attachment for a self-propelled vehicle having transversely spaced longitudinally extending side rails, said bumper and bulldozer attachment comprising supports carried by the side rails of the vehicle and extending longitudinally therefrom adjacent the front ends thereof, a concavely curved bumper carried by the supports and extending horizontally across the front of the vehicle with its concave side remote from said vehicle, a transversely curved bulldozer blade supported on the bumper for movement adjacent the lower edge thereof in a vertical arcuate path from an inactive position in which its concave side lies adjacent the concave side of the bumper to an active position in which it lies below the bumper with its concave side remote from the vehicle, transversely curved extensions detachably connected to the bumper and to the bulldozer blade and extending longitudinally from opposite ends thereof, and rollers carried by the extensions for engaging a surface and holding the leading edges of the bulldozer blade and the extensions in spaced relation to said surface.

7. A combination bumper and bulldozer attachment for a self-propelled vehicle having transversely spaced longitudinally extending side rails, said bumper and bulldozer attachment comprising supports carried by the side rails of the vehicle and extending longitudinally therefrom adjacent the front ends thereof, a concavely curved bumper carried by the supports and extending horizontally across the front of the vehicle with its concave side remote from said vehicle, a transversely curved bulldozer blade supported on the bumper for movement adjacent the lower edge thereof in a vertical arcuate path from an inactive position in which its concave side lines adjacent the concave side of the bumper to an active position in which it lies below the bumper with its concave side remote from the vehicle, and cushioning means carried by the supports and operatively connected to the bumper for yieldingly supporting the bumper for vertical movement.

8. A combination bumper and bulldozer attachment for a self-propelled vehicle having transversely spaced longitudinally extending side rails, said bumper and bulldozer attachment comprising supports carried by the side rails of the vehicle and extending longitudinally therefrom adjacent the front ends thereof, a concavely curved bumper carried by the supports and extending horizontally across the front of the vehicle with its concave side remote from said vehicle, a transversely curved bulldozer blade supported on the bumper for movement adjacent the lower edge thereof in a vertical arcuate path from an inactive position in which its concave side lies adjacent the concave side of the bumper to an active position in which it lies below the bumper with its concave side remote from the vehicle, and hydraulic means carried by the side rails and operatively connected to the supports for holding the bumper at a selected height in front of the vehicle.

References Cited in the file of this patent

UNITED STATES PATENTS

| | | |
|---|---|---|
| 1,387,576 | Worth | Aug. 16, 1921 |
| 1,492,120 | Calabrese | Apr. 29, 1924 |
| 2,061,585 | Meyer | Nov. 24, 1936 |
| 2,141,558 | Richter | Dec. 27, 1938 |
| 2,218,512 | Ball | Oct. 22, 1940 |
| 2,450,905 | Mork | Oct. 12, 1948 |